Figure 1:
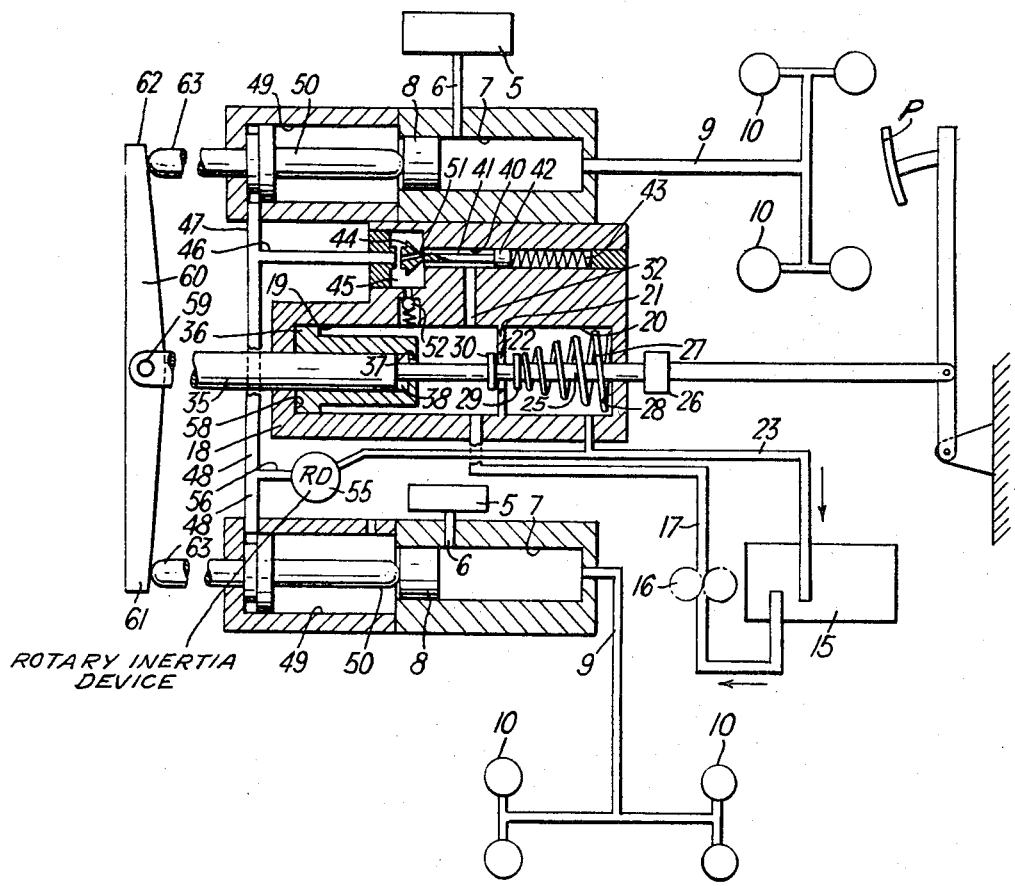

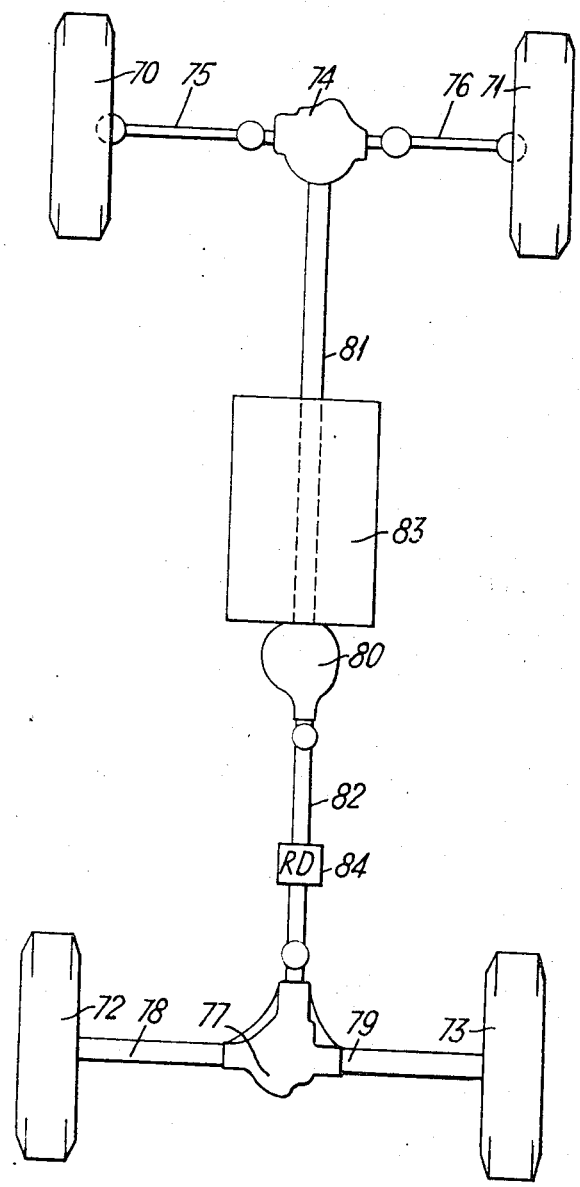

3,401,982
VEHICLE BRAKING SYSTEMS
Frederick J. Walker, Kenilworth, England, and William H.
Bent, Wantirna, Victoria, Australia, assignors to Harry
Ferguson Research Limited, Abbotswood, Stow-on-the-
Wold, Gloucestershire, England, a British company
Filed May 11, 1965, Ser. No. 454,934
Claims priority, application Great Britain, May 20, 1964,
20,761/64
12 Claims. (Cl. 303—21)

The invention relates to vehicle braking systems and is especially, but not exclusively, applicable to vehicles in which four or more wheels are engine driven through controlled differential gears.

The invention is a braking system including wheel brakes, manual means connected to said brakes for manually applying said brakes, a source of hydraulic fluid under pressure, and a servo-mechanism connected to said source interposed between said brakes and said manual means for power application of the brakes, said servo-mechanism including servo valve means movable by said manual means for positioning the brakes into first and second positions in which the brakes are respectively released and applied by said servo-mechanism, said servo-mechanism also including first and second reaction areas connected in lost motion relationship with said servo valve means and in communication with said source, the arrangement being such that said first reaction area resists movement of said servo valve means from said first into said second position, and said second reaction area resists movement of said servo valve means beyond said second position during normal braking of a vehicle in which the braking system is incorporated.

The term "manually" is used herein and in the claims to indicate either hand or foot operation of the brakes by the driver of the vehicle without the assistance of the hydraulic servo-mechanism.

By virtue of the lost-motion connection, said first and second reaction areas are adapted to be moved sequentially against the pressure of the hydraulic fluid in said servo-mechanism as said servo valve means moves from said first towards said second position. Preferably said first reaction area is of relatively smaller area and is in pressure-responsive relationship with the hydraulic fluid in said first position, and said second reaction area is of relatively larger area and is adapted to be brought into pressure-responsive relationship with the hydraulic fluid when said servo valve means reaches said second position.

Preferably also rotary inertia operated means is provided by virtue of which locking of a wheel or wheels due to excessive braking pressure is prevented.

In the case of a two-wheel drive vehicle a hydraulic servo-mechanism would normally be required for each vehicle wheel and the rotary inertia operated means would of necessity consist of a number of rotary inertia operated devices, one for each vehicle wheel. However, in a vehicle in which four or more wheels are engine driven through controlled differential gears, for example in a four-wheel drive vehicle including differential gears between the front and rear half-shafts and a main controlled differential gear between the front and rear propellor shafts, only a single hydraulic servo-mechanism and rotary inertia operated device are required, the rotary inertia operated device being connected to the front or the rear propeller shaft.

When the system includes said rotary inertia operated means, fluid flow control means is provided for controlling build-up of pressure in said hydraulic servo-mechanism after the reduction in pressure caused by operation of said rotary inertia operated means.

Preferably also the system includes non-return valve means, adapted to operate under a pressure differential created by movement of said means for applying the brakes from its second to its first position, to rapidly reduce pressure in said hydraulic servo-mechanism so as to release the brakes.

An embodiment of the invention will now be described, by way of example only with reference to the accompanying diagrammatic drawings in which FIG. 1 illustrates an exemplary braking system, and FIG. 2 illustrates a four-wheel drive vehicle incorporating said system. The system includes three hydraulic circuits, namely a closed hydraulic servo-mechanism circuit and pulsator-type front and rear brake circuits, and is designed for use with a vehicle in which four or more wheels are engine driven through controlled differential gears. Thus only a single rotary inertia operated device is provided. In the case of a four-wheel drive vehicle three controlled differentials would normally be required, namely one between the front half-shafts, another between the rear half-shafts and a third between the two propellor shafts from the engine to the front and rear differentials respectively.

Referring to FIG. 1 of the drawings, each pulsator-type brake circuit consists of a fluid reservoir 5 supplying fluid through a connection 6 to a cylinder 7 including a slidable piston 8. A connection 9 connects the cylinder 7 to the wheel brakes 10. One cylinder 7 is connected to the front brakes and the other to the rear brakes.

The hydraulic servo-mechanism circuit includes a sump 15 from which fluid is pumped by a pump 16 through connection 17 to a servo cylinder 18. The cylinder 18 consists of main and secondary chambers 19 and 20 separated by an annular flange 21 forming a restricted opening 22 between the two chambers. An outlet connection 23 leads from the secondary chamber 20 to the sump 15.

Means for applying the brakes in the form of a rod 25 passes centrally through the chambers 19, 20 and the opening 22, and is adapted for connection at one end 26 to a brake actuating pedal P. A spring 27 acting on the end wall 28 of the chamber 20 and on an abutment member 29 on the rod 25, biases the rod into a first or "brakes off" position in which it is shown in the drawing. In this position the brakes are released and the opening 22 is open so that fluid entering the chamber 19 from connection 17 may pass through the opening 22 and return to the sump 15 by way of the connection 23.

A valve member 30 is fitted on the rod 25 and occupies a position adjacent the opening 22 but within the main chamber 19 when the rod is in its first position as shown in the drawing. The valve member 30 is of a diameter approximately equal to that of the opening 22 so that when the rod 25 is moved to the right in the drawing the valve member 30 enters the opening 22 and prevents fluid flow through it. In practice about seven thousandths of an inch clearance is left between the valve member 30 and the opening 22. When the valve member 30 is disposed within the opening 22, the rod 25 is in second or "brakes-on" position in which the brakes are applied as will be described hereinafter. The valve member 30 and opening 22 constitute a servo valve, since a small rightward movement of the rod 25 and valve member 30 causes diversion of fluid supplied to the cylinder 18 through an outlet 32 resulting in application of the brakes.

The portion of the rod 25 which is within the main chamber 19 of the cylinder 18 includes an increased diameter portion 35 the diameter of which is, in the example, approximately equal to the diameter of the valve member 30. A piston 36 is mounted on the increased diameter portion 35 and has a one way connection with the shaft through a flange 37 engageable with the portion 35 when the rod 25 moves to the right. The piston 36 has a relatively large surface area or reaction area in communication with the pressure fluid in the chamber 19 compared with the surface area or reaction area of the valve member 30.

In the first position of the rod 25 shown in the drawing there is a clearance space 38 forming a lost-motion connection between the flange 37 and the increased diameter portion 35, but when the rod is moved into its second position in which the valve member 30 closes the opening 22, the clearance 38 is taken up so that further movement of the rod 25 to the right involves moving the piston 36 against the pressure of the fluid in the chamber 19. This requires considerably more force than was required to move the rod from its first into its second position, so that movement beyond the second position is prevented in normal operation and is permitted only in the event that there is failure of the servo-mechanism circuit as will be described hereinafter.

The aforementioned outlet 32 leads to a passage 40 in which a valve member 41 is slidably mounted. A piston 42 at the end of the valve member is acted on by a compression spring 43 and a valve head 44 at the other end is engageable with a seat on the passage 40 so as to control flow of fluid from the passage 40 to a chamber 45 and then by way of connections 46, 47 and 48 to cylinders 49 containing plungers 50 which abut against the pistons 8 of the brake circuits. The valve head 44 includes a through orifice 51 which permits restricted flow of fluid into the chamber 45 when the valve head is seated against the seat on the passage 40. A non-return valve 52 is disposed between the chamber 45 and the main chamber 19 of the cylinder 18 to permit flow of fluid from the chamber 45 to the chamber 19 but not in the reverse direction.

The rotary inertia operated device (RD) is shown diagrammatically at 55 and is connected to a branch connection 56 leading from the connection 48 to the sump 15 by way of the connection 23. Operation of the device reduces pressure in both cylinders 49 by opening connection 56 to the sump. The rotary inertia operated device may be of any known type such as, for example, that sold under the Registered Trademark "Maxaret" by the Dunlop Rubber Company Limited.

The increased diameter portion 35 of the rod 25 passes through an aperture in the end wall 58 of the chamber 19 and is pivotally connected at 59 to a crosspiece 60 the opposite ends 61 and 62 of which abut against push rods 63 projecting from the left hand ends of the plungers 50. The pivotal connection 59 is disposed exactly centrally of the crosspiece 60 so that when the increased diameter portion 35 of the rod 25 is moved to the right from its first position shown in the drawing, this movement is transmitted to both plungers 50 simultaneously by means of the crosspiece 60.

In operation, when the rod 25 is in its first position, fluid is pumped from the sump 15 to the chamber 19, through the opening 22 to the chamber 20, and hence back to the sump by way of the conduit 23. To apply the brakes the rod 25 is moved to the right. This forces the valve member 30 into the opening 22 to close the opening and direct the fluid through the outlet 32. The fluid then passes into the passage 40, past the valve head 44 and through the chamber 45 and connections 46, 47 and 48 to the left hand end of the cylinders 49. The pressure of the fluid forces the plungers 50 to the right thus forcing the pistons 8 of the brake circuits to the right to supply fluid through connections 9 and apply all four wheel brakes 10. When the brake pedal is released the rod 25 moves to the left under the action of the spring 27, allowing fluid to pass through the opening 22 to sump. The consequent reduction in pressure in the chamber 19 permits the fluid to drain from the cylinders 49 through the non-return valve 52 and through the outlet 32 into the chamber 19 thus releasing the brakes.

If the brakes are heavily applied such that all four wheels tend to lock, the rotary inertia operated device comes into operation to open the connection 56 to sump and thus reduce pressure in the cylinders 49 to partly release the brakes and prevent the wheels from locking. The pressure is not entirely released, but is fairly suddenly reduced and as long as the driver's foot remains on the brake pedal the pressure tends to build up rapidly so that the wheels tend to lock again. It is preferable that the pressure, once reduced, should build up slowly and not rapidly, and this is achieved in the example by the valve member 41.

At a pressure just below that at which the wheels tend to lock, the pressure in the passage 40 is sufficient to overcome the compression spring 43 and close the valve head 44 against its seat. This pressure could be, for example 200 pounds per square inch and depends upon various factors, for example road surface conditions and the weight of the vehicle. In this position only a limited amount of fluid can pass to the cylinders 49 since the flow is restricted to the amount which can pass through the orifice 51. Thus the pressures in the cylinders 49 and 7 build up slowly from the pressure at which the valve 7 build up slowly from the pressure at which the valve member 41 closes to the pressure at which the wheels tend to lock, whereupon the rotary inertia operated device comes into operation again.

There is a third position which can be assumed by the rod 25 in the event that the servo-mechanism circuit fails through reduction in pressure or loss of hydraulic fluid. In this third position the brakes are applied "manually". In normal operations, when the rod 25 reaches its second position in which the valve member 30 is positioned within the opening 22, the lost-motion clearance 38 is taken up and very considerable brake pedal effort is required to move the piston 36 against the pressure of the fluid in the chamber 19. The result is that during normal operation no such movement occurs. This arrangement gives the desired pedal "feel" to the driver of the vehicle, since the valve 30 provides a reaction area which produces a thrust against the foot in proportion to the servo pressure built up in consequence of the movement of the brake pedal, this pressure reaching a maximum when the valve 30 lies within the opening 22.

In the event that there is no fluid pressure in chamber 19 or that the fluid pressure is so low as to be easily overcome, the rod 25 moves into its third position in which the valve member 30 passes completely through the opening 22. In this position the fluid entering the chamber 19 is returned to sump as in the first position of the rod 25 and the brakes are applied through the linkage, 25, 35, 60 to 63 and the plungers 50 which latter act on the pistons 8.

Should one of the connections 9 fail due to leakage, then when the rod 25 is moved to its second position, the plunger 50 associated with the failed connection will move to the full limit of its travel without applying the brakes, and thereafter the full hydraulic pressure will be diverted to the other cylinder 49 to apply the brakes associated therewith. Thus should one set of brakes (either front or rear) fail, the vehicle may be stopped by application of the other brakes.

During operation of the rotary inertia operated device, though the pressure drops in the cylinders 49, the pressure is prevented from dropping in chamber 19 due to valve member 41 remaining seated. The rod 25 does not, therefore, move from its second to its third position.

The four-wheel drive vehicle illustrated in FIG. 2 includes four wheels 70, 71, 72 and 73 which are engine driven through controlled differential gears, namely one such gear 74 between the front half-shafts 75 and 76, another such gear 77 between the rear half-shafts 78 and 79, and a third such gear 80 between the two propellor shafts 81 and 82 from the engine 83 to the front and rear differentials 74 and 77, respectively. A rotary inertia operated device (RD) is shown at 84 and corresponds in function to that shown at 55 in FIG. 1.

We claim:
1. A braking system including wheel brakes, manual means connected to said brakes for manually applying said brakes, a source of hydraulic fluid under pressure, and a servo-mechanism connected to said source interposed between said brakes and said manual means for power application of the brakes, said servo-mechanism including servo valve means movable by said manual means for positioning the brakes into first and second positions in which the brakes are respectively released and applied by said servo-mechanism, said servo-mechanism also including first and second reaction areas connected in lost motion relationship with said servo valve means and in communication with said source, the arrangement being such that said first reaction area resists movement of said servo valve means from said first into said second position, and said second reaction area resists movement of said servo valve means beyond said second position during normal braking of a vehicle in which the braking system is incorporated.

2. A braking system according to claim 1 in which said first reaction area is of relatively smaller area and is in pressure-responsive relationship with the hydraulic fluid in said first position, and said second reaction area is of relatively larger area and is adapted to be brought into pressure-responsive relationship with the hydraulic fluid when said servo valve means reaches said second position.

3. A braking system according to claim 2 in which said servo valve means is carried by a shaft slidably housed in a chamber communicating with said source, said first reaction area being formed on said shaft and said second reaction area being formed on a piston mounted on said shaft and having a one way connection therewith.

4. A braking system according to claim 3 in which said servo valve means is a disc slidable through a restricted opening between a first chamber connected to a high pressure side of said source and a second chamber connected to a low pressure side of said source, said disc in said first position being disposed in said first chamber so as to permit fluid flow from said first to said second chamber, in said second position being disposed in said opening so as to prevent such flow, and being disposed in said second chamber during manual braking of a vehicle in which said braking system is incorporated.

5. A braking system according to claim 4 including rotary inertia operated means connected between said servo-mechanism and a low pressure side of said source and mechanically linked to the vehicle transmission, excessive deceleration of the transmission actuating said rotary inertia operated means to momentarily connect said servo-mechanism to said low pressure side of said source.

6. A braking system according to claim 5 including fluid flow control means for controlling repressurization pressure in said servo-mechanism after the reduction in pressure caused by operation of said rotary inertia operated means.

7. A braking system according to claim 6 in which said fluid flow control means includes a valve, disposed between said wheel brakes and said servo-mechanism, and having a restricted orifice therethrough whereby on closure of the valve by excessive braking pressure, limited fluid flow is permitted through the orifice.

8. A braking system according to claim 7 including non-return valve means adapted to operate under a pressure differential created by movement of said servo valve means from said second to said first position to rapidly reduce pressure in said hydraulic servo-mechanism so as to release the brakes.

9. A braking system according to claim 8 including a mechanical linkage connected between said wheel brakes and said manual means for applying the brakes through said connection and operable to apply the brakes on movement of said servo-valve means from said second to a third position.

10. A braking system according to claim 9 in which said wheel brakes include front wheel brakes operated through a hydraulic pulsator system and rear wheel brakes operated through a separate hydraulic pulsator system both said hydraulic pulsator systems being hydraulically connected to said servo-mechanism.

11. A braking system according to claim 10 in which said mechanical linkage includes push rods connected to respective pistons of each hydraulic system, a cross-piece opposite ends of which abut said push rods, and a link pivotally connected to a point on said crosspiece intermediate said ends and connected to said manual means for applying said wheel brakes through said connection.

12. A braking system according to claim 1, applied to a vehicle having a four wheel drive including a differential gear between the front half shafts, a differential gear between the rear half shafts and a differential gear between front and rear propellor shafts, and rotary inertia operator means driven by one of said propellor shafts and operative on excessive deceleration of that propellor shaft to momentarily reduce the brake-applying pressure by connecting said servo-mechanism to a low pressure side of said source.

References Cited

UNITED STATES PATENTS 3,250,575   5/1966   Shilton _____ 188—152

FOREIGN PATENTS 691,044   5/1940   Germany.
198,007   5/1923   Great Britain.

DUANE A. REGER, *Primary Examiner.*